United States Patent
Harmon

(10) Patent No.: US 9,882,931 B1
(45) Date of Patent: Jan. 30, 2018

(54) SYSTEMS AND METHODS FOR DETECTING POTENTIALLY ILLEGITIMATE WIRELESS ACCESS POINTS

(71) Applicant: Symantec Corporation, Mountain View, CA (US)

(72) Inventor: Justin Harmon, Knoxville, TN (US)

(73) Assignee: Symantec Corporation, Mountain View, CA (US)

(*) Notice: Subject to any disclaimer, the term of this patent is extended or adjusted under 35 U.S.C. 154(b) by 130 days.

(21) Appl. No.: 14/625,075

(22) Filed: Feb. 18, 2015

(51) Int. Cl.
*H04L 29/06* (2006.01)
*H04W 12/12* (2009.01)

(52) U.S. Cl.
CPC ......... *H04L 63/1483* (2013.01); *H04W 12/12* (2013.01); *H04L 63/1441* (2013.01)

(58) Field of Classification Search
CPC ............. H04L 63/1483; H04L 63/1441; H04L 63/1433; H04L 63/107; H04W 12/12
See application file for complete search history.

(56) References Cited

U.S. PATENT DOCUMENTS

| | | |
|---|---|---|
| 8,191,143 B1 | 5/2012 | Lin et al. |
| 8,606,219 B1 | 12/2013 | Barbee et al. |
| 8,844,041 B1 | 9/2014 | Kienzle et al. |
| 9,420,513 B1 | 8/2016 | Yalagandula et al. |
| 9,730,075 B1 | 8/2017 | Shavell et al. |
| 2003/0219008 A1 | 11/2003 | Hrastar |
| 2003/0233567 A1 | 12/2003 | Lynn et al. |
| 2004/0117624 A1 | 6/2004 | Brandt et al. |
| 2004/0236547 A1 | 11/2004 | Rappaport et al. |
| 2006/0193284 A1* | 8/2006 | Stieglitz ............. H04L 63/0492 370/328 |
| 2006/0200862 A1 | 9/2006 | Olson et al. |
| 2007/0079376 A1* | 4/2007 | Robert ................ H04L 63/1408 726/23 |
| 2007/0153763 A1 | 7/2007 | Rampolla et al. |
| 2007/0283042 A1 | 12/2007 | West et al. |
| 2010/0172259 A1* | 7/2010 | Aggarwal ........... H04L 63/1466 370/252 |
| 2010/0207732 A1 | 8/2010 | Patwari et al. |

(Continued)

OTHER PUBLICATIONS

Michael Shavell, et al; Systems and Methods for Preventing Computing Devices from Sending Wireless Probe Packets; U.S. Appl. No. 14/949,927, filed Nov. 24, 2015.

(Continued)

*Primary Examiner* — Nelson Giddins
(74) *Attorney, Agent, or Firm* — FisherBroyles, LLP

(57) ABSTRACT

The disclosed computer-implemented method for detecting potentially illegitimate wireless access points may include (1) detecting, at a current point in time, an attempt by a computing device to automatically connect to a target wireless access point that resembles a known wireless access point with which the computing device has established a previous connection at a previous point in time, (2) detecting at least one suspicious discrepancy between the target wireless access point and the known wireless access point, and then (3) determining, based at least in part on the suspicious discrepancy, that the target wireless access point is potentially illegitimate. Various other methods, systems, and computer-readable media are also disclosed.

20 Claims, 6 Drawing Sheets

(56) References Cited

U.S. PATENT DOCUMENTS

| | | | |
|---|---|---|---|
| 2012/0304297 A1 | 11/2012 | Chung et al. | |
| 2012/0309420 A1* | 12/2012 | Morgan | G01S 5/02 |
| | | | 455/456.1 |
| 2013/0182697 A1 | 7/2013 | Tuominen et al. | |
| 2013/0217358 A1 | 8/2013 | Snider | |
| 2013/0217411 A1 | 8/2013 | Croy et al. | |
| 2014/0201808 A1 | 7/2014 | Yada | |
| 2014/0304770 A1* | 10/2014 | Jung | H04W 12/12 |
| | | | 726/2 |
| 2014/0378059 A1 | 12/2014 | Ouchi | |
| 2015/0024787 A1 | 1/2015 | Ben-Itzhak et al. | |
| 2016/0029217 A1* | 1/2016 | Yoo | H04W 12/08 |
| | | | 726/4 |
| 2016/0149935 A1 | 5/2016 | Liu et al. | |
| 2016/0192136 A1* | 6/2016 | Pan | H04W 12/06 |
| | | | 455/456.1 |
| 2016/0316426 A1 | 10/2016 | Kumar | |

OTHER PUBLICATIONS

"802.11 WLAN Packet Types", http://www.wildpackets.com/resources/compendium/wireless_lan/wlan_packet_types, as accessed Oct. 14, 2015, (Apr. 15, 2010).

Ankit Kurani; Systems and Methods for Detecting Potentially Illegitimate Wireless Access Points; U.S. Appl. No. 14/732,811, filed Jun. 8, 2015.

"Domain Name System", http://en.wikipedia.org/wiki/Domain_Name_System, as accessed Apr. 6, 2015, Wikipedia, (Jan. 23, 2004).

Mitchell, Bradley "What Is a DNS Server?", http://compnetworking.about.com/od/dns_domainnamesystem/f/dns_servers.htm, as accessed Apr. 6, 2015, (Feb. 19, 2007).

"What is the difference between public and private IP addresses?", http://supportcenter.verio.com/KB/questions.php?questionid=655, as accessed Apr. 6, 2015, Verio Inc., (on or before Apr. 6, 2015).

Justin Harmon; Systems and Methods for Detecting Potentially Illegitimate Wireless Access Points; U.S. Appl. No. 14/608,218, filed Jan. 29, 2015.

Michael Shavell, et al; Systems and Methods for Detecting Illegitimate Devices on Wireless Networks; U.S. Appl. No. 14/616,763, filed Feb. 9, 2015.

Michael Shavell, et al; Systems and Methods for Detecting Illegitimate Devices on Wireless Networks; U.S. Appl. No. 14/616,761, filed Feb. 9, 2015.

Lim, Kwontaek et al., "Scheme of Rogue AP detection in managed WLAN based on AP's location", http://xuebao.nuc.edu.cn/new/english.php?id=85&tid=646, as accessed Dec. 3, 2014, Journal of Measurement Science and Instrumentation, vol. 3 No. 4, Sum No. 12, (Dec. 2012).

Lim, Kwontaek et al., "Scheme of Rogue AP detection in managed WLAN based on AP's location", http://xuebao.nuc.edu.cn/new/uploads/File/jmsi2012-4-370.pdf, as accessed Dec. 3, 2014, Journal of Measurement Science and Instrumentation, vol. 3 No. 4, Sum No. 12, (Dec. 2012), pp. 370-373.

"WiFi Pineapple", https://www.wifipineapple.com/, as accessed Dec. 3, 2014, (Sep. 26, 2011).

"Smart WiFi Toggler", https://play.google.com/store/apps/details?id=com.sebouh00.smartwifitoggler&hl=en, as accessed Dec. 3, 2014, (Dec. 13, 2012).

"Coordinate Distance Calculator", http://boulter.com/gps/distance/?from=38.2500%B0+N%2C+85.7667%B0+W&to=38.0297%B0+N%2C+84.4947%B0+W&units=m, as accessed Dec. 3, 2014, (on or before Dec. 3, 2014).

"802.11 WLAN Packet Types", http://www.wildpackets.com/resources/compendium/wireless_lan/wlan_packet_types, as accessed Dec. 3, 2014, WildPackets, Inc., (Apr. 15, 2010).

"Wireless access point", http://en.wikipedia.org/wiki/Wireless_access_point, as accessed Dec. 3, 2014, Wikipedia, (Apr. 14, 2004).

"Stop connecting to a particular wifi network based on my location", http://android.stackexchange.com/questions/83925/stop-connecting-to-a-particular-wifi-network-based-on-my-location, as accessed Dec. 3, 2014, (Oct. 2, 2014).

"How to block apps on tablet from accessing the Internet while on tethering", http://android.stackexchange.com/questions/63987/how-to-block-apps-on-tablet-from-accessing-the-internet-while-on-tethering, as accessed Dec. 3, 2014, (Feb. 21, 2014).

Cipriani, Jason "Stop Android 4.3 from always scanning for Wi-Fi networks", http://www.cnet.com/how-to/stop-android-4-3-from-always-scanning-for-wi-fi-networks/, as accessed Dec. 3, 2014, (Aug. 2, 2013).

Boubina DR, "How to Disable Wifi Auto Connect on iPhone", https://snapguide.com/guides/disable-wifi-auto-connect-on-iphone/, as accessed Dec. 3, 2014, (Jul. 22, 2012).

"LG G3—WiFi Auto-On Issue", https://support.t-mobile.com/thread/75809, as accessed Dec. 3, 2014, (Aug. 7, 2014).

"Best Practices for Rogue Detection and Annihilation", http://airmagnet.flukenetworks.com/assets/whitepaper/Rogue_Detection_White_Paper.pdf, as accessed Dec. 3, 2014, A Technical Whitepaper, AirMagnet, Inc., (Nov. 2004).

"How do you prevent rogue wireless access points on a network?", http://networkengineering.stackexchange.com/questions/123/how-do-you-prevent-rogue-wireless-access-points-on-a-network, as accessed Dec. 3, 2014, (May 8, 2013).

K. N., Gopinath et al., "All You Wanted to Know About WiFi Rogue Access Points", http://www.rogueap.com/rogue-ap-docs/RogueAP-FAQ.pdf, as accessed Dec. 3, 2014, AirTight Networks, Inc., (2009).

"Rogue access point", http://en.wikipedia.org/wiki/Rogue_access_point, as accessed Dec. 3, 2014, Wikipedia, (Oct. 22, 2005).

"Rogue access points: Preventing, detecting and handling best practices", http://searchnetworking.techtarget.com/Rogue-access-points-Preventing-detecting-and-handling-best-practices, as accessed Dec. 3, 2014, TechTarget, (May 2009).

"Tracking down a rogue access point", http://security.stackexchange.com/questions/10783/tracking-down-a-rogue-access-point, as accessed Dec. 9, 2014, (Jan. 18, 2012).

"Traceroute", https://en.wikipedia.org/wiki/Traceroute, as accessed Dec. 9, 2014, Wikipedia, (Feb. 24, 2004).

Hunt, Troy "The beginners guide to breaking website security with nothing more than a Pineapple", http://www.troyhunt.com/2013/04/the-beginners-guide-to-breaking-website.html, as accessed Dec. 9, 2014, (Apr. 17, 2013).

Michael Shavell, et al.; Systems and Methods for Detecting Illegitimate Devices on Wireless Networks; U.S. Appl. No. 14/617,245, filed Feb. 9, 2015.

"Why don't wifi managers remember mac addresses for hotspots to defeat the jasager attack?", http://security.stackexchange.com/questions/14854/why-dont-wifi-managers-remember-mac-addresses-for-hotspots-to-defeat-the-jasage, as accessed Dec. 9, 2014, (May 10, 2012).

"7. MAC Frame Formats", http://grouper.ieee.org/groups/802/15/pub/2001/Jul01/01292r1P802-15_TG3-Proposed-Changes-to-Frame-Formats.pdf, as accessed Dec. 9, 2014, (2001).

"Frame check sequence", http://en.wikipedia.org/wiki/Frame_check_sequence, as accessed Dec. 9, 2014, Wikipedia, (Apr. 5, 2005).

"Service set (802.11 network)", http://en.wikipedia.org/wiki/Service_set_%28802.11_network%29, as accessed Dec. 9, 2014, Wikipedia, (Jul. 10, 2009).

"Part 11: Wireless LAN Medium Access Control (MAC) and Physical Layer (PHY) Specifications", http://standards.ieee.org/getieee802/download/802.11-2012.pdf, as accessed Dec. 9, 2014, IEEE Std 802.11™-2012 (Revision of IEEE Std 802.11-2007), IEEE Computer Society, New York, (Feb. 6, 2012).

Dai Zovi, Dino A., "Karma Attacks Radioed Machines Automatically", http://theta44.org/karma/, as accessed Dec. 9, 2014, (Jan. 17, 2006).

Girsas, Paul "Wifi Radar", https://play.google.com/store/apps/details?id=girsas.wifiradar&hl=en, as accessed Jan. 16, 2015, (Dec. 24, 2013).

"Chapter 6—Configuring Radio Setting", http://www.cisco.com/c/en/us/td/docs/wireless/access_point/12-4_10b_JA/configuration/

(56) References Cited

OTHER PUBLICATIONS guide/scg12410b/scg12410b-chap6-radio.html, as accessed Jan. 16, 2015, Cisco, (On or before Sep. 15, 2014).
"Chapter 9—Configuring an Access Point as a Local Authenticator", http://www.cisco.com/c/en/us/td/docs/wireless/access_point/12-4_10b_JA/configuration/guide/scg12410b/scg12410b-chap9-localauth.html, as accessed Jan. 16, 2015, Cisco, (On or before Sep. 6, 2014).
"WLA Series Wireless LAN Access Points", https://www.juniper.net/assets/us/en/local/pdf/datasheets/1000359-en.pdf, as accessed Jan. 16, 2015, Data Sheet, Juniper Networks, Inc., (Jun. 2013).
"Aruba 100 Series Access Points", http://www.arubanetworks.com/assets/ds/DS_AP100Series.pdf, as accessed Jan. 16, 2015, Data Sheet, Aruba Networks, Inc., (On or before Jan. 16, 2015).
Notenboom, Leo A., "How can I block neighboring wireless networks?", http://ask-leo.com/how_can_i_block_neighboring_wireless_networks.html, as accessed Jan. 16, 2015, (Jan. 30, 2007).
Roos, Dave "How Wireless Mesh Networks Work", http://computer.howstuffworks.com/how-wireless-mesh-networks-work.htm, as accessed Jan. 16, 2015, (Dec. 4, 2008).
Leslie, David "Rogue Wireless Access Point Detection and Remediation", http://www.giac.org/paper/gsec/4060/rogue-wireless-access-point-detection-remediation/106460, as accessed Jan. 16, 2015, Global Information Assurance Certification Paper, SANS Institute 2004, (Sep. 9, 2004).
Pacchiano, Ronald "How to Track Down Rogue Wireless Access Points", http://www.smallbusinesscomputing.com/webmaster/article.php/3590656/How-to-Track-Down-Rogue-Wireless-Access-Points.htm, as accessed Jan. 16, 2015, (Mar. 10, 2006).
"Rogue Detection under Unified Wireless Networks", http://www.cisco.com/c/en/us/support/docs/wireless-mobility/wireless-lan-wlan/70987-rogue-detect.html, as accessed Jan. 16, 2015, Document ID: 70987, Cisco, (On or before Sep. 25, 2007).
"Locating Rogue WiFi Access Points", https://www.virtuesecurity.com/blog/locating-rogue-wifi-access-points/, as accessed Jan. 16, 2015, Virtue Security, (Oct. 5, 2013).
"NetSurveyor—802.11 Network Discovery / WiFi Scanner", http://nutsaboutnets.com/netsurveyor-wifi-scanner/, as accessed Jan. 16, 2015, Nuts About Nets, (Nov. 16, 2011).
Michael. Shavell, et al.; Systems and Methods for Detecting Network Security Deficiencies on Endpoint Devices; U.S. Appl. No. 15/199,149, filed Jun. 30, 2016.
Captive portal; https://en.wikipedia.org/wiki/Captive_portal, as accessed May 17, 2016; Wikipedia; (Jan. 25, 2005).

\* cited by examiner

```
                            Wireless Profile
                                208(1)
----------------------------------------------------------------------
****************************************************

CORRESPONDING WIRELESS ACCESS POINT:          Known Wireless Access Point (35 RSSI)

SURROUNDING ACCESS POINTS (SIGNAL STRENGTH):  Wireless Access Point 210(4) (15 RSSI)
                                              Wireless Access Point 210(5) (35 RSSI)
                                              Wireless Access Point 210(6) (25 RSSI)

TIMESTAMP:                                    01-20-2015 09:58:15 UTC

****************************************************
----------------------------------------------------------------------
```

```
                            Wireless Profile
                                208(N)
----------------------------------------------------------------------
****************************************************

CORRESPONDING WIRELESS ACCESS POINT:          Wireless Access Point 206 (30 RSSI)

SURROUNDING ACCESS POINTS (SIGNAL STRENGTH):  Wireless Access Point 210(1) (25 RSSI)
                                              Wireless Access Point 210(2) (5 RSSI)
                                              Wireless Access Point 210(3) (10 RSSI)

TIMESTAMP:                                    01-25-2015 11:23:19 UTC

SYSTEMS AND METHODS FOR DETECTING POTENTIALLY ILLEGITIMATE WIRELESS ACCESS POINTS

BACKGROUND

Wireless access points may provide users of Internet-enabled devices with efficient and/or widespread access to wired network connections. For example, an enterprise may provide employees and/or customers with wireless access to a Local Area Network (LAN) by implementing multiple access points throughout a building covered by the LAN. In addition, a router within a personal or home network may include a wireless access point that provides wireless Internet service to multiple devices within a home. To facilitate an efficient connection to a wireless access point, many computing devices may store the configuration details of the wireless access point after connecting to the wireless access point for the first time. When re-entering the range of the wireless access point, such computing devices may request access to the wireless access point and quickly re-connect.

Unfortunately, traditional technologies for connecting computing devices to wireless access points may have certain security deficiencies that leave the computing devices vulnerable to attack. For example, conventional network security systems may fail to provide any reliable and/or trusted techniques for computing devices to verify the legitimacy and/or identity of wireless access points. As a result, an attacker may configure a malicious device (e.g., a so-called WIFI PINEAPPLE) to mimic the credentials of a wireless access point known to a computing device. In other words, the malicious device may represent an illegitimate access point masquerading as the known access point. After the computing device connects to this illegitimate access point, the attacker using the malicious device may view all network traffic distributed to and from the computing device.

The instant disclosure, therefore, identifies and addresses a need for improved systems and methods for detecting potentially illegitimate wireless access points.

SUMMARY

As will be described in greater detail below, the instant disclosure describes various systems and methods for detecting potentially illegitimate wireless access points by comparing and/or analyzing the wireless access points detected near a target wireless access point with the wireless access points previously detected near the actual wireless access point.

In one example, a computer-implemented method for detecting potentially illegitimate wireless access points may include (1) detecting, at a current point in time, an attempt by a computing device to automatically connect to a target wireless access point that resembles a known wireless access point with which the computing device has established a previous connection at a previous point in time, (2) detecting at least one suspicious discrepancy between the target wireless access point and the known wireless access point by (A) identifying a set of surrounding access points that were located within a certain range of the computing device when the computing device established the previous connection with the known wireless access point at the previous point in time and (B) identifying an at least partially different set of surrounding access points that are located within the certain range of the computing device at the current point in time, and then (3) determining, based at least in part on the suspicious discrepancy, that the target wireless access point is potentially illegitimate.

In one example, the method may also include identifying a wireless profile that specifies the set of surrounding access points that were located within the certain range of the computing device when the computing device established the previous connection with the known wireless access point. In this example, the method may further include identifying each surrounding access point that is located within the certain range of the computing device at the current point in time and then detecting the discrepancy by comparing each surrounding access point located within the certain range of the computing device at the current point in time with the set of surrounding access points specified in the wireless profile.

In one example, the method may also include creating the wireless profile when the computing device established a first connection with the known wireless access point at a first point in time. In this example, the method may further include updating, at the previous point in time and after the first point in time, the wireless profile to specify each surrounding access point that was located within the certain range of the computing device when the computing device established the previous connection with the known wireless access point.

In one example, the method may also include creating a current wireless profile that specifies each surrounding access point that is located within the certain range of the computing device at the current point in time. In this example, the method may further include comparing the current wireless profile with the wireless profile that specifies the set of surrounding access points that were located within the certain range of the computing device when the computing device established the previous connection with the known wireless access point. Additionally or alternatively, the method may include determining, based at least in part on the comparison, that the current wireless profile does not match the wireless profile that specifies the set of surrounding access points that were located within the certain range of the computing device when the computing device established the previous connection with the known wireless access point.

In one example, the wireless profile may further specify a signal strength of each surrounding access point within the set of surrounding access points that were located within the certain range of the computing device when the computing device established the previous connection with the known wireless access point. In this example, the method may also include identifying at least one signal strength of at least one surrounding access point that is located within the certain range of the computing device at the current point in time. Additionally or alternatively, the method may include determining that the signal strength of the surrounding access point does not match a corresponding signal strength of the surrounding access point as specified in the wireless profile.

In one example, the method may also include determining that at least one surrounding access point that is located within the certain range of the computing device at the current point in time was not located within the certain range of the computing device when the computing device established the previous connection with the known wireless access point. Additionally or alternatively, the method may include determining that at least one surrounding access point that was located within the certain range of the computing device when the computing device established the previous connection with the known wireless access point is not located within the certain range of the computing device at the current point in time.

In one example, the method may also include identifying each surrounding access point that was emitting a signal whose strength reached a certain threshold at the previous point in time. In this example, the method may further include identifying each surrounding access point that is emitting a signal whose strength reaches a certain threshold at the current point in time.

In one example, the method may also include calculating a difference score that represents the amount of difference between the set of surrounding access points that were located within a certain range of the computing device when the computing device established the previous connection with the known wireless access point and the at least partially different set of surrounding access points that are located within the certain range of the computing device at the current point in time. In this example, the method may further include determining that the difference score exceeds a certain threshold.

In one example, the method may also include detecting an attempt by the computing device to automatically connect to a wireless access point alleging to be the known wireless access point. In this example, the method may further include transmitting, from the computing device, a request to connect to the known wireless access point and then receiving, from the wireless access point and in response to the transmitted request, a communication in which the wireless access point alleges to be the known wireless access point.

In one example, the method may also include blocking access to the target wireless access point in response to determining that the target wireless access point is potentially illegitimate. In another example, the method may further include prompting a user of the computing device to manually decide whether to connect to the target wireless access point in response to determining that the target wireless access point is potentially illegitimate. Additionally or alternatively, the method may include determining that the target wireless access point is masquerading as the known wireless access point.

In one example, the method may also include detecting an attempt by the computing device to automatically connect to an additional target wireless access point that resembles the known wireless access point at an additional point in time. In this example, the method may further include identifying a set of surrounding access points that are located within the certain range of the computing device at the additional point in time. Next, the method may include determining that the set of surrounding access points that are located within the certain range of the computing device at the additional point in time match the set of surrounding access points that were located within the certain range of the computing device when the computing device established the previous connection with the known wireless access point. Finally, the method may include enabling the computing device to connect to the additional target wireless access point.

In one example, a system for implementing the above-described method may include (1) a detection module, stored in memory, that (A) detects, at a current point in time, an attempt by a computing device to automatically connect to a target wireless access point that resembles a known wireless access point with which the computing device has established a previous connection at a previous point in time and (B) detects at least one suspicious discrepancy between the target wireless access point and the known wireless access point by (I) identifying a set of surrounding access points that were located within a certain range of the computing device when the computing device established the previous connection with the known wireless access point at the previous point in time and (II) identifying an at least partially different set of surrounding access points that are located within the certain range of the computing device at the current point in time, (2) a determination module, stored in memory, that determines, based at least in part on the suspicious discrepancy, that the target wireless access point is potentially illegitimate, and (3) at least one physical processor that executes the detection module and the determination module.

In one example, the above-described method may be encoded as computer-readable instructions on a non-transitory computer-readable medium. For example, a computer-readable medium may include one or more computer-executable instructions that, when executed by at least one processor of a computing device, may cause the computing device to (1) detect, at a current point in time, an attempt by the computing device to automatically connect to a target wireless access point that resembles a known wireless access point with which the computing device has established a previous connection at a previous point in time, (2) detect at least one suspicious discrepancy between the target wireless access point and the known wireless access point by (A) identifying a set of surrounding access points that were located within a certain range of the computing device when the computing device established the previous connection with the known wireless access point at the previous point in time and (B) identifying an at least partially different set of surrounding access points that are located within the certain range of the computing device at the current point in time, and (3) determine, based at least in part on the suspicious discrepancy, that the target wireless access point is potentially illegitimate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of exemplary wireless profiles for wireless access points.

Figure 1:
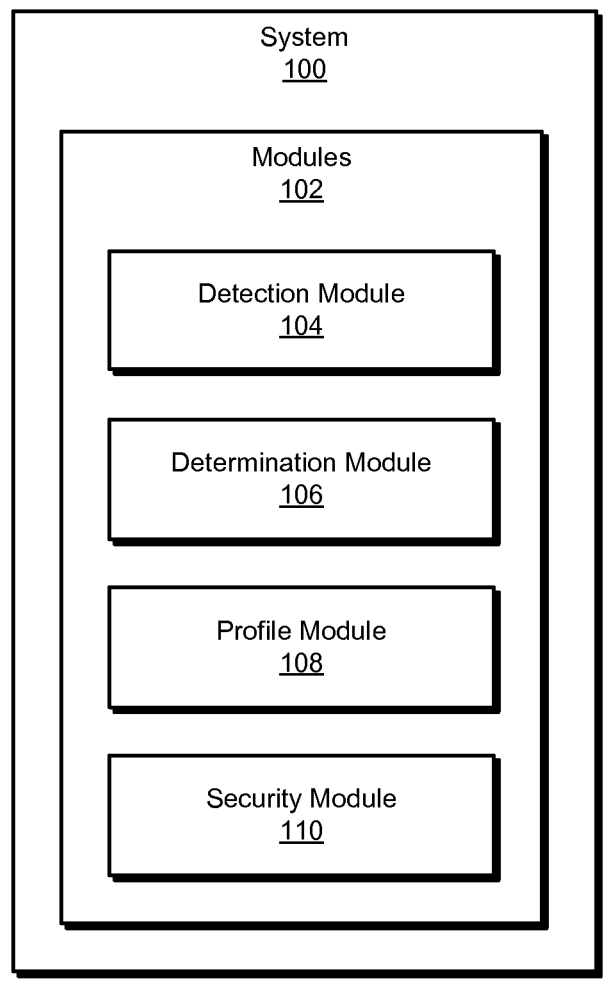
FIG. 1 is a block diagram of an exemplary system for detecting potentially illegitimate wireless access points.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting potentially illegitimate wireless access points. As will be explained in greater detail below, by comparing and/or analyzing the wireless access points detected near a purported wireless access point with the wireless access points previously detected near the actual wireless access point, the systems and methods described herein may be able to detect a suspicious discrepancy among the wireless access points located near the purported wireless access point and the actual wireless access point. The systems and methods described herein may then be able to determine that the purported wireless access point is potentially illegitimate or even malicious based at least in part on the suspicious discrepancy. In an effort to prevent any harm to the computing device and/or an invasion of the user's privacy, the systems and methods described herein may block access to and/or discontinue a connection with the purported wireless access point.

Figure 2:
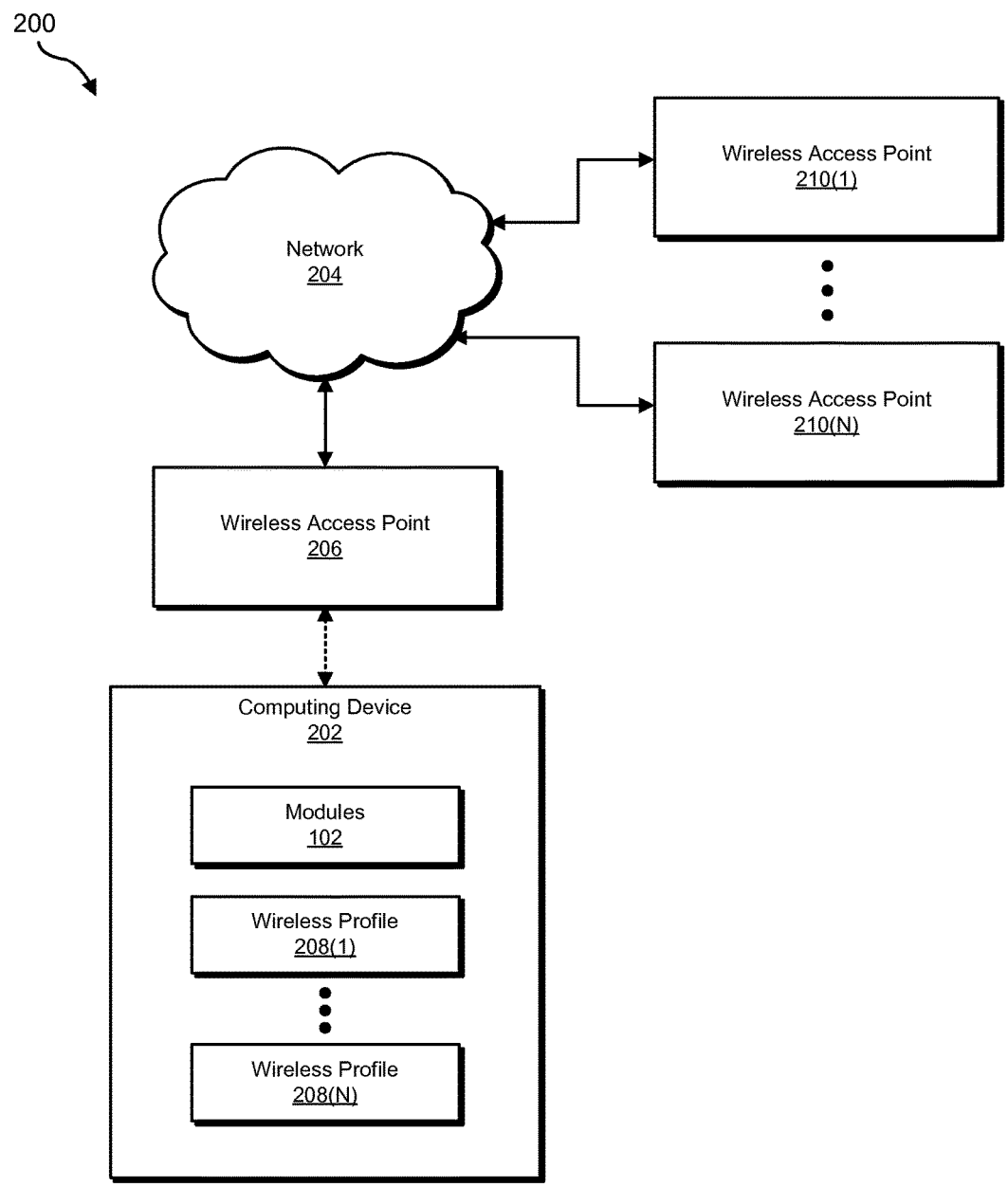
FIG. 2 is a block diagram of an additional exemplary system for detecting potentially illegitimate wireless access points.

The following will provide, with reference to FIGS. 1-2, detailed descriptions of exemplary systems for detecting potentially illegitimate wireless access points. Detailed descriptions of corresponding computer-implemented methods will also be provided in connection with FIG. 3. In addition, detailed descriptions of exemplary wireless profiles will be provided in connection with FIG. 4. Finally, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting potentially illegitimate wireless access points. As illustrated in this figure, exemplary system 100 may include one or more modules 102 for performing one or more tasks. For example, and as will be explained in greater detail below, exemplary system 100 may include a detection module 104 that detects, at a current point in time, an attempt by a computing device to automatically connect to a target wireless access point that resembles a known wireless access point with which the computing device has established a previous connection at a previous point in time. Additionally or alternatively, detection module 104 may detect at least one suspicious discrepancy between the target wireless access point and the known wireless access point by (1) identifying a set of surrounding access points that were located within a certain range of the computing device when the computing device established the previous connection with the known wireless access point at the previous point in time and (2) identifying an at least partially different set of surrounding access points that are located within the certain range of the computing device at the current point in time.

As will be described in greater detail below, exemplary system 100 may also include a determination module 106 that determines, based at least in part on the suspicious discrepancy, that the target wireless access point is potentially illegitimate. Exemplary system 100 may further include a profile module 108 that identifies and/or creates a wireless profile that specifies the set of surrounding access points that were located within the certain range of the computing device when the computing device established the previous connection with the known wireless access point. Finally, exemplary system 100 may include a security module 110 that performs at least one security action in response to the determination that the target wireless access point is potentially illegitimate. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 attempting to connect to a wireless access point 206 that facilitates access to network 204. In addition, system 200 may include one or more surrounding wireless access points 210(1)-(N) located within a certain range of computing device 202 at the point in time that computing device 202 is attempting to connect to wireless access point 206.

In one example, computing device 202 may be programmed with one or more of modules 102 that facilitate determining the legitimacy of wireless access point 206. In this example, computing device 202 may include one or more wireless profiles 208(1)-(N). Each of wireless profiles 208(1)-(N) may correspond to a specific wireless access point and/or specify the set of surrounding access points that are located within a certain range of computing device 202 when computing device 202 establishes a connection with that wireless access point at a specific point in time.

In one embodiment, one or more of modules 102 from FIG. 1 may, when executed by at least one processor of computing device 202, enable computing device 202 to detect potentially illegitimate wireless access points. For example, and as will be described in greater detail below, detection module 104 may cause computing device 202 to (1) detect, at a current point in time, an attempt by computing device 202 to automatically connect to wireless access point 206 that resembles a known wireless access point with which computing device 202 has established a previous connection at a previous point in time, (2) detect at least one suspicious discrepancy between wireless access point 206 and the known wireless access point by (A) identifying a set of surrounding access points that were located within a certain range of computing device 202 when computing device 202 established the previous connection with the known wireless access point at the previous point in time and (B) identifying an at least partially different set of surrounding access points 210(1)-(N) that are located within the certain range of computing device 202 at the current point in time, and then (3) determine, based at least in part on the suspicious discrepancy, that wireless access point 206 is potentially illegitimate.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Wireless access points 206 and 210(1)-(N) generally represent any type or form of physical or virtual wireless access point. The term "wireless access point," as used herein, generally refers to any device and/or portion of executable code that facilitates a connection between a computing device and a wired network. In one example, a wireless access point may represent and/or reside within a router, switch, or other network device. In another example, a wireless access point may represent a separate physical device. Additionally or alternatively, a wireless access point may represent and/or include a malicious network device (such as a so-called WIFI PINEAPPLE) that emulates, masquerades as, and/or purports to be a different wireless access point.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, a Power Line Communications (PLC) network, a cellular network (e.g., a Global System for Mobile Communications (GSM) network), exemplary network architecture 600 in FIG. 6, variations of one or more of the same, portions of one or more of the same, combinations of one or more of the same, or any other suitable network. Network 204 may facilitate communication or data transfer using wireless or wired connections. In one embodiment, computing device 202 may access (or at least attempt to access) network 204 by way of wireless access point 206.

Wireless profiles 208(1)-(N) generally represents any type or form of record, file, and/or profile that identifies certain information about a wireless access point. In one example, wireless access profiles 208(1)-(N) may each correspond to a specific wireless access point and/or specify the set of surrounding access points that are located within a certain range of computing device 202 when computing device 202 establishes a connection with that wireless access point at a specific point in time. In this example, wireless access profiles 208(1)-(N) may also specify the respective strengths of the signals emitted by the surrounding access points located within the certain range of computing device 202 at that specific point in time.

Figure 3:
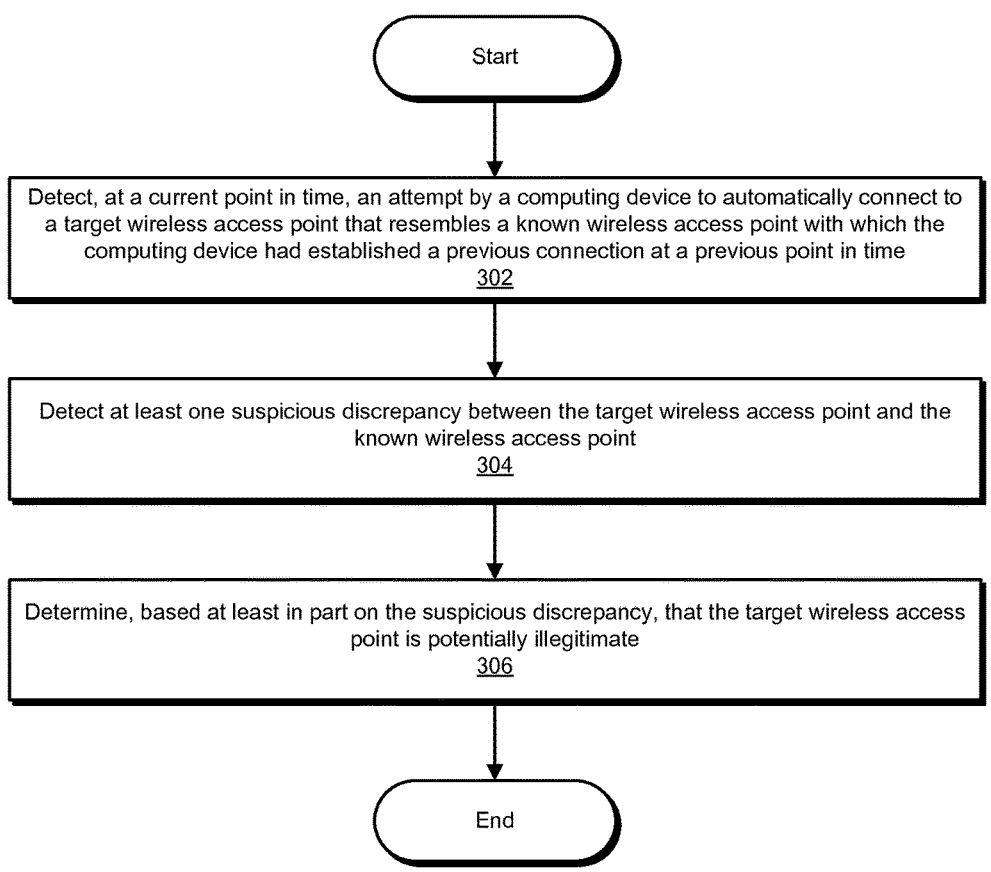
FIG. 3 is a flow diagram of an exemplary method for detecting potentially illegitimate wireless access points.

FIG. 3 is a flow diagram of an exemplary computer-implemented method 300 for detecting potentially illegitimate wireless access points. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may detect, at a current point in time, an attempt by a computing device to automatically connect to a target wireless access point that resembles a known wireless access point with which the computing device has established a previous connection at a previous point in time. For example, detection module 104 may, as part of computing device 202 in FIG. 2, detect an attempt by computing device 202 to automatically connect to wireless access point 206 at a current point in time. In this example, wireless access point 206 may emulate, masquerade as, and/or purport to be a known wireless access point with which computing device 202 has established a previous connection at a previous point in time.

Computing device 202 may be attempting to establish any type or form of connection. In one example, computing device 202 may be attempting to establish a WIFI connection with wireless access point 206. In another example, computing device 202 may be attempting to establish a BLUETOOTH connection with wireless access point 206. In a further example, computing device 202 may be attempting to establish a Z-WAVE connection with wireless access point 206. Alternatively, computing device 202 may be attempting to establish a ZIGBEE connection with wireless access point 206.

The systems described herein may perform step 302 in a variety of ways and/or contexts. In some examples, detection module 104 may detect the attempt to automatically connect to wireless access point 206 based at least in part on certain communications between computing device 202 and wireless access point 206. For example, detection module 104 may detect the transmission of a request from computing device 202 to connect to a known wireless access point. In this example, the request may include certain information about the known wireless access point to which computing device 202 prefers to connect. Such information about the known wireless access point may include the Basic Service Set IDentifier (BSSID) or Media Access Control (MAC) address of the known wireless access point and/or the Service Set IDentifier (SSID) of the network to which the known wireless access point facilitates access.

In some examples, computing device 202 may prefer to connect to a known wireless access point with which computing device 202 has previously established a connection. In one example, computing device 202 may collect information about a wireless access point when computing device 202 connects to the wireless access point for the first time. By collecting the information about the wireless access point in this way, computing device 202 may use this information to attempt to automatically re-connect to the (now known) wireless access point at a later point in time.

In some examples, computing device 202 may be configured to automatically and periodically (e.g., every half second, every minute, etc.) transmit a request to connect to the known wireless access point. For example, when not connected to any network, computing device 202 may repeatedly transmit probe request frames (via an 802.11 protocol) that contain the BSSIDs of any known wireless access points. Notably, by automatically transmitting such probe request frames in this way, computing device 202 may be able to efficiently connect to familiar wireless access point and/or access familiar networks. However, by automatically re-connecting to public and/or unsecure networks in this way, computing device 202 may increase the risk of attackers eavesdropping on and/or gaining access to sensitive information transmitted by computing device 202 via such networks. Moreover, by automatically distributing probe request frames for known networks, computing device 202 may provide attackers with certain information (such as BSSIDs, MAC addresses, and/or SSIDs) that facilitates generating malicious networks that resemble, masquerade as, and/or purport to be known networks (via, e.g., devices such as the so-called WIFI PINEAPPLE).

In response to transmitting a request to connect to the known wireless access point, computing device 202 may receive a communication (such as a probe response frame) from wireless access point 206 in which wireless access point 206 masquerades as and/or purports to be the known wireless access point. The phrases "masquerading as" and "purporting to be," as used herein, generally refer to any type or form of process and/or procedure by which a device is able to resemble, display certain characteristics of, and/or explicitly claim to be a particular wireless access point under false pretenses. In one example, the communication received from wireless access point 206 may include certain information specific to the known wireless access point (such as the known wireless access point's BSSID, MAC address, and/or SSID), thereby implying and/or suggesting that wireless access point 206 is the known wireless access point.

Returning to FIG. 3, at step 304 one or more of the systems described herein may detect at least one suspicious discrepancy between the target wireless access point and the known wireless access point. For example, detection module 104 may, as part of computing device 202 in FIG. 2, detect at least one suspicious discrepancy between wireless access point 206 and the known wireless access point. In this example, detection module 104 may begin searching for such a discrepancy in response to the detection of the attempt by computing device 202 to connect to wireless access point 206.

The systems described herein may perform step 304 in a variety of ways and/or contexts. In some examples, detection module 104 may detect the suspicious discrepancy based at least in part on the surrounding wireless access points located within a certain range of computing device 202 at the point in time that computing device 202 attempts to connect to wireless access point 206. In one example, detection module 104 may identify one or more of surrounding wireless access points 210(1)-(N) as currently being located within the certain range of computing device 202. For example, detection module 104 may detect each surrounding wireless access point that is currently emitting a signal whose strength reaches a certain threshold (e.g., any measureable level). In this example, detection module 104 may identify one or more of wireless access points 210(1)-(N) as being located within the certain range of computing device 202 due at least in part to the signals emitted by wireless access points 210(1)-(N).

In one example, detection module 104 may identify a set of surrounding wireless access points that were previously detected near the known wireless access point. For example, detection module 104 may detect each surrounding wireless access point emitting a signal whose strength reaches a certain threshold (e.g., any measureable level) when computing device 202 last established a connection with the known wireless access point. In this example, detection module 104 may identify the set of surrounding wireless access points as being located within the certain range of computing device 202 due at least in part to the signals emitted by that set of surrounding wireless access points.

Upon identifying (1) the set of surrounding wireless access points that were previously detected near the known wireless access point and (2) the set of wireless access points 210(1)-(N) that are currently located within the certain range of computing device 202, detection module 104 may detect the suspicious discrepancy between wireless access point 206 and the known wireless access point based at least in part on these sets of surrounding wireless access points. For example, detection module 104 may determine that set of wireless access points 210(1)-(N) is at least partially different from the set of surrounding wireless access points that were previously located within the certain range of computing device 202.

Detection module 104 may determine that set of wireless access points 210(1)-(N) and the set of surrounding wireless access points that were previously detected near the known wireless access point differ from one another in a variety of ways. In one example, detection module 104 may determine that set of wireless access points 210(1)-(N) and the set of surrounding wireless access points that were previously detected near the known wireless access point differ in the sense that one of these sets includes one or more wireless access points that are excluded by the other set. For example, set of wireless access points 210(1)-(N) may include at least one wireless access point that was excluded from the previous set of surrounding wireless access points. Additionally or alternatively, set of wireless access points 210(1)-(N) may exclude at least one wireless access point that was included in the previous set of surrounding wireless access points.

As another example, detection module 104 may determine that the strength of the signal emitted by a specific wireless access point differs between the previous point in time and the current point in time. In other words, detection module 104 may determine that the strength of the signal currently emitted by the specific wireless access point does not match the strength of the signal previously emitted by the specific wireless access point. For example, set of wireless access points 210(1)-(N) and the set of wireless access points that were previously located near the known wireless access point may both include at least one wireless access point whose signal strength changed between the previous point in time and the current point in time.

In some examples, profile module 108 may identify a wireless profile that specifies the set of surrounding access points that were located within the certain range of computing device 202 when computing device 202 established the previous connection with the known wireless access point. For example, profile module 108 may create wireless profile 208(1) for the known wireless access point when computing device 202 established a connection with the known wireless access point for the first time. Additionally or alternatively, profile module 108 may update wireless profile 208(1) to specify each surrounding access point that is located within the certain range of computing device 202 every time that computing device 202 establishes a subsequent connection with the known wireless access point.

In one example, detection module 104 may detect the suspicious discrepancy between wireless access point 206 and the known wireless access point based at least in part on wireless profile 208(1). For example, detection module 104 may identify each surrounding wireless access point that is currently located within the certain range of computing device 202. In this example, detection module 104 may compare each surrounding wireless access point that is currently located within the certain range of computing device 202 with the set of wireless access points specified by wireless profile 208(1). Detection module 104 may then detect the suspicious discrepancy based at least in part on this comparison.

In some examples, profile module 108 may create a wireless profile that specifies the set of surrounding access points that are currently located within the certain range of computing device 202. For example, profile module 108 may create wireless profile 208(N) for wireless access point 206 in response to the detection of the attempt by computing device 202 to automatically connect to wireless access point 206 at the current point in time. In this example, detection module 104 may compare wireless profile 208(N) with wireless profile 208(1). Detection module 104 may then detect the suspicious discrepancy by determining, based at least in part on this comparison, that wireless profile 208(N) does not match wireless profile 208(1) to an acceptable degree.

As a specific example, detection module 104 may compare wireless profile 208(N) in FIG. 4 for the target wireless access point with wireless profile 208(1) in FIG. 4 for the known wireless access point. As shown in FIG. 4, wireless profile 208(1) may identify the corresponding wireless access point (in this example, the known wireless access point), the strength of the signal detected from the known wireless access point (in this example, 35 Received Signal Strength Indicator (RSSI)), the surrounding wireless access points detected near the known wireless access point when computing device 202 last established a connection with the known wireless access point (in this example, wireless access points 210(4), 210(5), and 210(6)), the strengths of the signals detected from the surrounding wireless access points (in this example, 15 RSSI, 35 RSSI, and 25 RSSI, respectively). In addition, wireless profile 208(1) may include a timestamp that identifies the time of creation and/or the point in time that computing device 202 last established a connection with the known wireless access point (in this example, 01-20-2015 09:58:15 UTC).

As shown in FIG. 4, wireless profile 208(N) may identify the corresponding target wireless access point (in this example, wireless access point 206), the strength of the signal detected from the target wireless access point (in this example, 30 RSSI), the surrounding wireless access points detected near the target wireless access point at the current point in time (in this example, wireless access points 210(1), 210(2), and 210(3)), and the strengths of the signals detected from the surrounding wireless access points (in this example, 25 RSSI, 5 RSSI, and 10 RSSI, respectively). In addition, wireless profile 208(N) may include a timestamp that identifies the time of creation and/or the current point in time (in this example, 01-25-2015 11:23:19 UTC).

Upon comparing wireless profile 208(N) in FIG. 4 with wireless profile 208(1) in FIG. 4, detection module 104 may detect a suspicious discrepancy between the target wireless access point and the known wireless access point. For example, detection module 104 may determine that none of the wireless access points identified in wireless profile 208(N) are identified in wireless profile 208(1) as having been detected near the known wireless access point when computing device 202 last established a connection with the known wireless access point. Since, in this example, the target wireless access point is purporting to be the known wireless access point, detection module 104 may identify and/or classify this discrepancy as being suspicious.

Returning to FIG. 3, at step 306 one or more of the systems described herein may determine that the target wireless access point is potentially illegitimate based at least in part on the suspicious discrepancy. For example, determination module 106 may, as part of computing device 202 in FIG. 2, determine that wireless access point 206 is potentially illegitimate based at least in part on the suspicious discrepancy. The term "potentially illegitimate," as used herein, generally refers to any wireless access point emulating, masquerading as, and/or purporting to be a different wireless access point. Accordingly, determination module 106 may determine that wireless access point 206 is masquerading as the known wireless access point.

The systems described herein may perform step 306 in a variety of ways and/or contexts. In some examples, determination module 106 may determine that wireless access point 206 is potentially illegitimate based at least in part on the number of non-matching surrounding wireless access points. In one example, determination module 106 may determine that a threshold number or percentage of surrounding wireless access points 210(1)-(N) do not match those wireless access points detected near the known wireless access point at the previous point in time. For example, determination module 106 may determine that none of surrounding wireless access points 210(1)-(N) match those detected near the known wireless access point at the previous point in time. As s a result, determination module 106 may determine that wireless access point 206 is potentially illegitimate and/or malicious.

In some examples, determination module 106 may determine that wireless access point 206 is potentially illegitimate based at least in part on the signal strength of one or more matching surrounding wireless access points. For example, determination module 106 may determine that the signal strength of a surrounding wireless access point detected near wireless access point 206 at the current point in time does not match the signal strength of the same wireless access point detected near the known wireless access point at the previous point in time. As a result, determination module 106 may determine that wireless access point 206 is potentially illegitimate and/or malicious.

In some examples, determination module 106 may determine that wireless access point 206 is potentially illegitimate based at least in part on a difference score. For example, determination module 106 may calculate a difference score that represents the amount of difference and/or change between the set of surrounding access points that were located within the certain range of computing device 202 when computing device established the previous connection with the known wireless access point and set of surrounding wireless access points 210(1)-(N). In this example, determination module 106 may apply any type or form of algorithm, formula, and/or policy in calculating the difference score. Determination module 106 may then determine that the difference score exceeds a certain threshold (e.g., 70%, 80%, or 90% difference).

In one example, the difference score may be based at least in part on the number of surrounding wireless access points detected near wireless access point 206 at the current point in time that do not match those detected near the known wireless access point at the previous point in time. In addition, the difference score may be based at least in part on the signal strengths of any matching wireless access points.

In response to the determination that wireless access point 206 is potentially illegitimate, one or more of the systems described herein may perform at least one security action to mitigate any potential threat from wireless access point 206. For example, security module 110 may, as part of computing device 202 in FIG. 2, block access to and/or discontinue a connection with wireless access point 206. Additionally or alternatively, security module 110 may prompt a user of computing device 202 to manually decide whether to connect to wireless access point 206 even though wireless access point 206 is potentially illegitimate.

In one example, detection module 104 may detect an attempt by computing device 202 to automatically connect to an additional target wireless access point (not illustrated in FIG. 2) that resembles the known wireless access point at an additional point in time. In this example, detection module 104 may identify a set of surrounding access points (not illustrated in FIG. 2) that are located within the certain range of computing device 202 at the additional point in time. Determination module 106 may then determine that the set of surrounding access points that are located within the certain range of computing device 202 at the additional point in time match the set of surrounding access points that were located within the certain range of computing device 202 when computing device 202 established the previous connection with the known wireless access point. In response to this determination, security module 110 may enable and/or allow computing device 202 to connect to the additional target wireless access point.

As explained above in connection with exemplary method 300 in FIG. 3, a mobile device may attempt to automatically connect to known wireless access points. In one example, an attacker may configure a WIFI PINEAPPLE to masquerade as a wireless access point that is known to the mobile device. In an effort to avoid any harm and/or an invasion of the user's privacy, the mobile device may determine that the WIFI PINEAPPLE is not actually the known wireless access point upon attempting to establish a connection with the WIFI PINEAPPLE. For example, the mobile device may compare the surrounding wireless access points detected near the WIFI PINEAPPLE during the attempt with the wireless access points previously detected near the known wireless access point.

In the event that the mobile device detects enough discrepancy between those wireless access points during the comparison, the mobile device may determine that the known wireless access point is likely being spoofed by a WIFI PINEAPPLE (or a similar device). As a result, the mobile device may stop the attempt to automatically connect to the WIFI PINEAPPLE by blocking access to the WIFI PINEAPPLE. Additionally or alternatively, the mobile device may prompt a user of computing device 202 to manually decide whether to connect to the WIFI PINEAPPLE even though the WIFI PINEAPPLE is not likely to be the actual known wireless access point.

Figure 5:
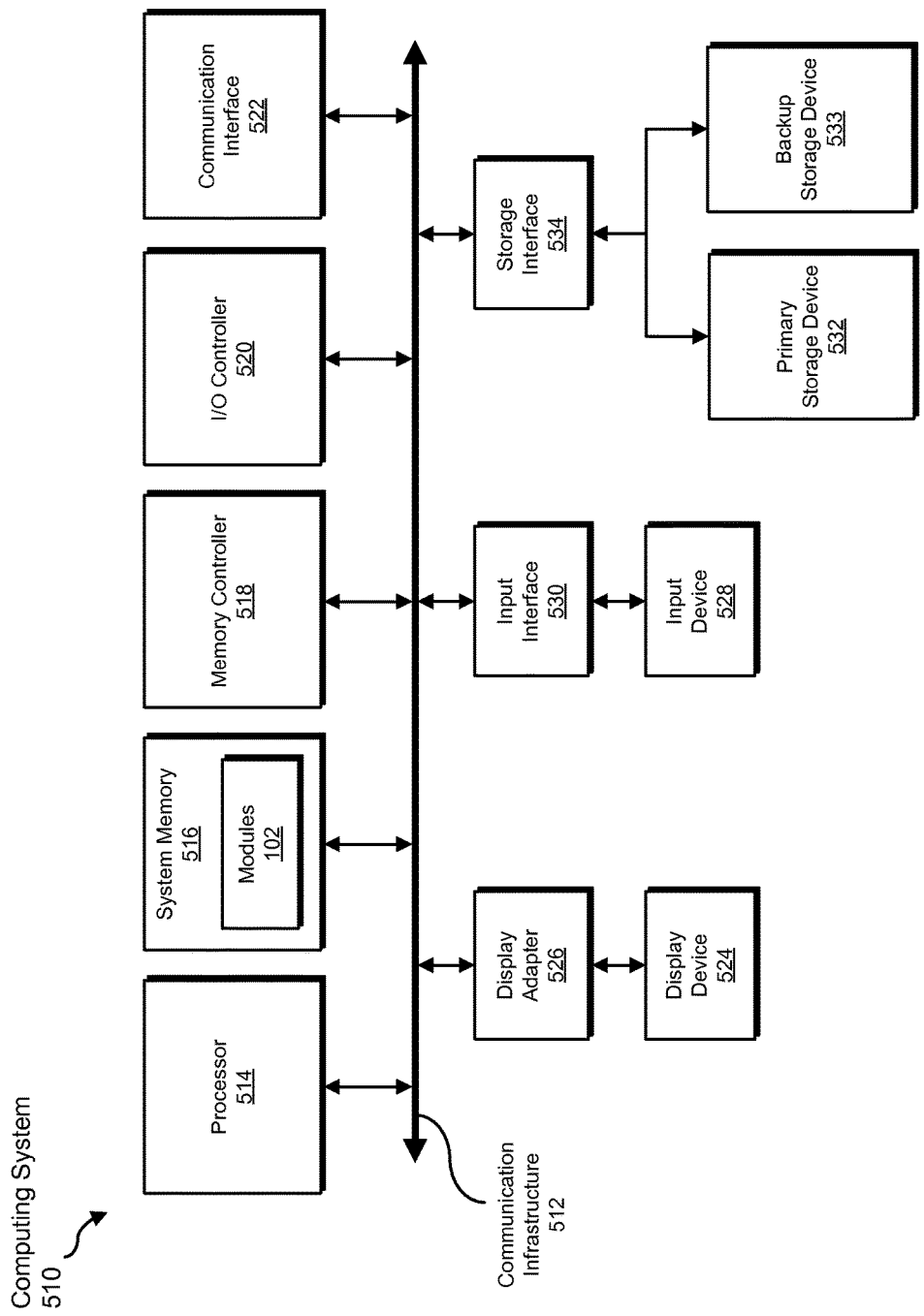
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
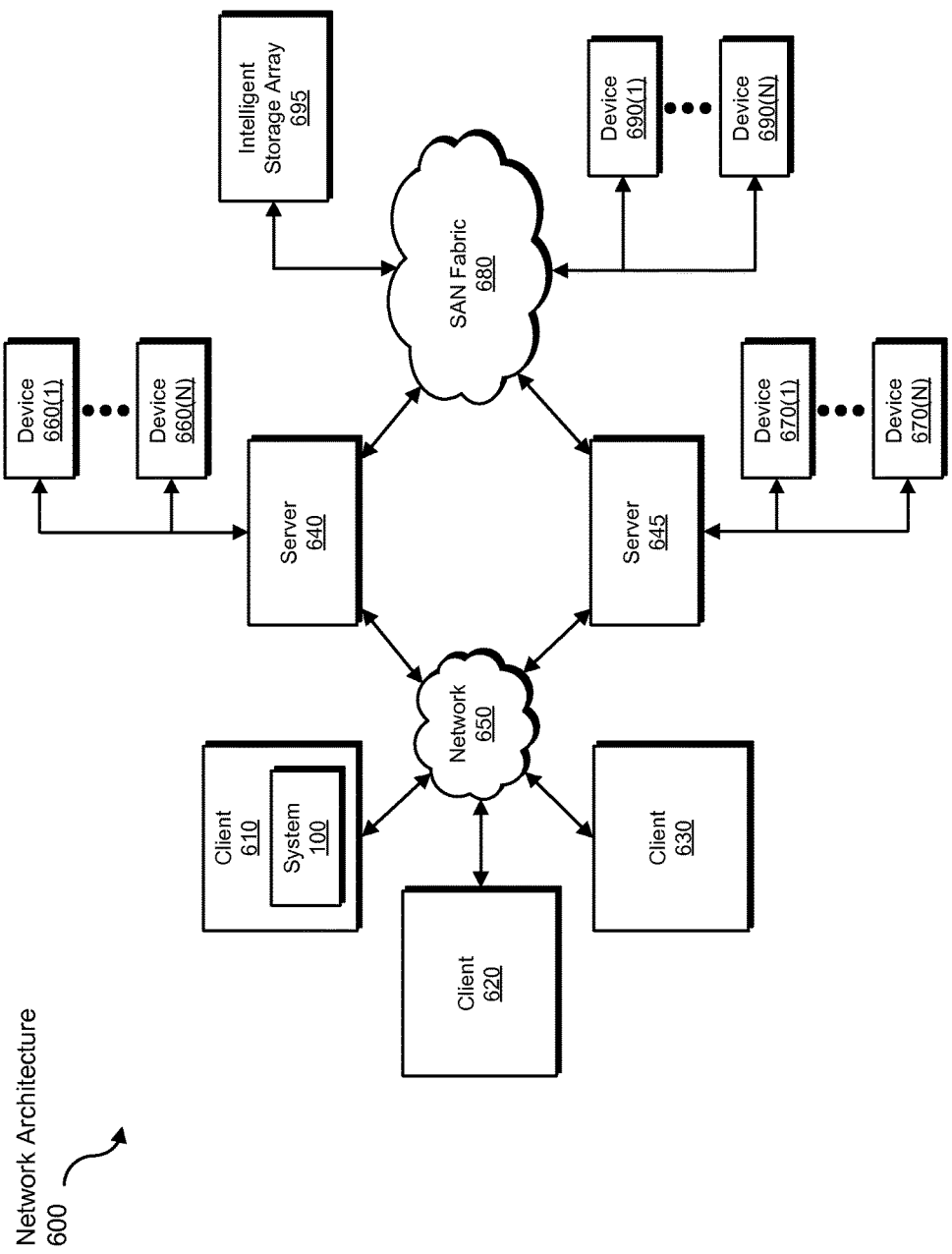
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting potentially illegitimate wireless access points.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an attempt by a computing device to connect to a wireless access point to be transformed, transform the attempt, output a result of the transformation to the computing device, use the result of the transformation to prevent the computing device from connecting to a potentially malicious wireless access point, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting potentially illegitimate wireless access points, at least a portion of the method being performed by a computing device comprising at least one processor, the method comprising:
   detecting, at a current point in time, an attempt by the computing device to automatically connect to a target wireless access point that resembles a known wireless access point with which the computing device has established a previous connection at a previous point in time;
   detecting at least one suspicious discrepancy between the target wireless access point and the known wireless access point by:
      identifying a set of surrounding access points that were located within a certain range of the computing device when the computing device established the previous connection with the known wireless access point at the previous point in time;
      identifying an at least partially different set of surrounding access points that are located within the certain range of the computing device at the current point in time;
   determining a number of the surrounding access points from the at least partially different set that do not match any of the surrounding access points from the set;
   determining that the number of non-matching surrounding access points exceeds a threshold number;
   determining that the target wireless access point is potentially illegitimate based on the number of non-matching surrounding access points exceeding the threshold number.

2. The method of claim 1, further comprising identifying a wireless profile that specifies the set of surrounding access points that were located within the certain range of the computing device when the computing device established the previous connection with the known wireless access point.

3. The method of claim 2, wherein detecting the suspicious discrepancy between the target wireless access point and the known wireless access point comprises:
   identifying each surrounding access point that is located within the certain range of the computing device at the current point in time;
   detecting the discrepancy by comparing each surrounding access point located within the certain range of the computing device at the current point in time with the set of surrounding access points specified in the wireless profile.

4. The method of claim 2, wherein identifying the wireless profile that specifies the set of surrounding access points that were located within the certain range of the computing device when the computing device established the previous connection with the known wireless access point comprises creating the wireless profile when the computing device established a first connection with the known wireless access point at a first point in time;
   further comprising updating, at the previous point in time and after the first point in time, the wireless profile to specify each surrounding access point that was located within the certain range of the computing device when the computing device established the previous connection with the known wireless access point.

5. The method of claim 2, further comprising creating, in response to detecting the attempt by the computing device to automatically connect to the target wireless access point, a current wireless profile that specifies each surrounding access point that is located within the certain range of the computing device at the current point in time;
   wherein detecting the suspicious discrepancy between the target wireless access point and the known wireless access point comprises:
      comparing the current wireless profile with the wireless profile that specifies the set of surrounding access points that were located within the certain range of the computing device when the computing device established the previous connection with the known wireless access point;
      determining, based at least in part on the comparison, that the current wireless profile does not match the wireless profile that specifies the set of surrounding access points that were located within the certain range of the computing device when the computing device established the previous connection with the known wireless access point.

6. The method of claim 2, wherein:
   the wireless profile further specifies a signal strength of each surrounding access point within the set of surrounding access points that were located within the certain range of the computing device when the computing device established the previous connection with the known wireless access point;
   detecting the suspicious discrepancy between the target wireless access point and the known wireless access point further comprises,
      identifying at least one signal strength of at least one surrounding access point that is located within the certain range of the computing device at the current point in time;
      determining that the signal strength of the surrounding access point does not match a corresponding signal strength of the surrounding access point as specified in the wireless profile.

7. The method of claim 1, wherein detecting the suspicious discrepancy between the target wireless access point and the known wireless access point comprises determining that at least one surrounding access point that is located within the certain range of the computing device at the current point in time was not located within the certain range of the computing device when the computing device established the previous connection with the known wireless access point.

8. The method of claim 1, wherein detecting the suspicious discrepancy between the target wireless access point and the known wireless access point comprises determining that at least one surrounding access point that was located within the certain range of the computing device when the computing device established the previous connection with the known wireless access point is not located within the certain range of the computing device at the current point in time.

9. The method of claim 1, wherein:
   identifying the set of surrounding access points that were located within the certain range of the computing device when the computing device established the previous connection with the known wireless access point comprises identifying each surrounding access point that was emitting a signal whose strength reached a certain threshold at the previous point in time;
   identifying the at least partially different set of surrounding access points that are located within the certain range of the computing device at the current point in time comprises identifying each surrounding access point that is emitting a signal whose strength reaches a certain threshold at the current point in time.

10. The method of claim 9, wherein at least one of the certain threshold at the previous point in time and the certain threshold at the current point in time comprises any measurable level of signal strength.

11. The method of claim 1, wherein detecting the attempt by the computing device to automatically connect to the target wireless access point that resembles the known wireless access point comprises detecting an attempt by the computing device to automatically connect to a wireless access point purporting to be the known wireless access point.

12. The method of claim 11, wherein detecting the attempt to automatically connect to the wireless access point purporting to be the known wireless access point comprises:
   transmitting, from the computing device, a request to connect to the known wireless access point;
   receiving, from the wireless access point and in response to the transmitted request, a communication in which the wireless access point purports to be the known wireless access point.

13. The method of claim 1, further comprising blocking access to the target wireless access point in response to determining that the target wireless access point is potentially illegitimate.

14. The method of claim 1, further comprising prompting a user of the computing device to manually decide whether to connect to the target wireless access point in response to determining that the target wireless access point is potentially illegitimate.

15. The method of claim 1, wherein determining that the target wireless access point is potentially illegitimate comprises determining that the target wireless access point is masquerading as the known wireless access point.

16. The method of claim 1, further comprising:
   detecting an attempt by the computing device to automatically connect to an additional target wireless access point that resembles the known wireless access point at an additional point in time;

identifying a set of surrounding access points that are located within the certain range of the computing device at the additional point in time;

determining that the set of surrounding access points that are located within the certain range of the computing device at the additional point in time match the set of surrounding access points that were located within the certain range of the computing device when the computing device established the previous connection with the known wireless access point;

in response to determining that the set of surrounding access points that are located within the certain range of the computing device at the additional point in time match the set of surrounding access points that were located within the certain range of the computing device when the computing device established the previous connection with the known wireless access point, enabling the computing device to connect to the additional target wireless access point.

17. A system for detecting potentially illegitimate wireless access points, the system comprising:

a detection module, stored in memory, that:
detects, at a current point in time, an attempt by a computing device to automatically connect to a target wireless access point that resembles a known wireless access point with which the computing device has established a previous connection at a previous point in time;
detects at least one suspicious discrepancy between the target wireless access point and the known wireless access point by:
identifying a set of surrounding access points that were located within a certain range of the computing device when the computing device established the previous connection with the known wireless access point at the previous point in time;
identifying an at least partially different set of surrounding access points that are located within the certain range of the computing device at the current point in time;

a determination module, stored in memory, that:
determines a number of the surrounding access points from the at least partially different set that do not match any of the surrounding access points from the set;
determines that the number of non-matching surrounding access points exceeds a threshold number;
determines that the target wireless access point is potentially illegitimate based on the number of non-matching surrounding access points exceeding the threshold number;

at least one physical processor that executes the detection module and the determination module.

18. The system of claim 17, further comprising a profile module, stored in memory, that identifies a wireless profile that specifies the set of surrounding access points that were located within the certain range of the computing device when the computing device established the previous connection with the known wireless access point;

wherein the physical processor further executes the profile module.

19. The system of claim 18, wherein the detection module detects the suspicious discrepancy between the target wireless access point and the known wireless access point by:

identifying each surrounding access point that is located within the certain range of the computing device at the current point in time;

compares each surrounding access point located within the certain range of the computing device at the current point in time with the set of surrounding access points specified in the wireless profile.

20. A non-transitory computer-readable medium comprising one or more computer-executable instructions that, when executed by at least one processor of a computing device, cause the computing device to:

detect, at a current point in time, an attempt by the computing device to automatically connect to a target wireless access point that resembles a known wireless access point with which the computing device has established a previous connection at a previous point in time;

detect at least one suspicious discrepancy between the target wireless access point and the known wireless access point by:
identifying a set of surrounding access points that were located within a certain range of the computing device when the computing device established the previous connection with the known wireless access point at the previous point in time;
identifying an at least partially different set of surrounding access points that are located within the certain range of the computing device at the current point in time;

determine a number of the surrounding access points from the at least partially different set that do not match any of the surrounding access points from the set;

determine that the number of non-matching surrounding access points exceeds a threshold number;

determine that the target wireless access point is potentially illegitimate based on the number of non-matching surrounding access points exceeding the threshold number.

* * * * *

UNITED STATES PATENT AND TRADEMARK OFFICE
CERTIFICATE OF CORRECTION

| | |
|---|---|
| PATENT NO. | : 9,882,931 B1 |
| APPLICATION NO. | : 14/625075 |
| DATED | : January 30, 2018 |
| INVENTOR(S) | : Harmon |

It is certified that error appears in the above-identified patent and that said Letters Patent is hereby corrected as shown below:

In Column 20, Line 34, in Claim 1, delete "processor," and insert -- processor, and memory storing a detection module, a determination module, and a security module, wherein the detection module, the determination module, and the security module are executed by the processor to cause the computing device to perform the method, --, therefor.

In Column 20, Line 35, in Claim 1, delete "detecting," and insert -- detecting, by the detection module of the computing device, --, therefor.

In Column 20, Line 41, in Claim 1, delete "detecting," and insert -- detecting, by the detection module of the computing device, --, therefor.

In Column 20, Line 44, in Claim 1, delete "identifying" and insert -- identifying, by the detection module of the computing device, --, therefor.

In Column 20, Line 49, in Claim 1, delete "identifying" and insert -- identifying, by the detection module of the computing device, --, therefor.

In Column 20, Line 53, in Claim 1, delete "determining" and insert -- determining, by the detection module of the computing device, --, therefor.

In Column 20, Line 56, in Claim 1, delete "determining" and insert -- determining, by the detection module of the computing device, --, therefor.

In Column 20, Line 58, in Claim 1, delete "determining" and insert -- determining, by the detection module of the computing device, --, therefor.

In Column 20, Line 61, in Claim 1, delete "number." and insert -- number; and stopping, by the security module of the computing device, the attempt by the computing device to automatically connect to the target wireless access point by blocking access to the target wireless access point in response to determining that the target wireless access point is potentially illegitimate. --, therefor.

Signed and Sealed this
Twenty-fourth Day of April, 2018

Andrei Iancu
*Director of the United States Patent and Trademark Office*

CERTIFICATE OF CORRECTION (continued)
U.S. Pat. No. 9,882,931 B1

In Column 23, Line 24, in Claim 17, delete "memory," and insert -- memory on a computing device, --, therefor.

In Column 23, Line 43, in Claim 17, delete "memory," and insert -- memory on a computing device, --, therefor.

In Column 23, Line 53, in Claim 17, delete "number;" and insert -- and a security module, stored in memory on the computing device, that: stops the attempt by the computing device to automatically connect to the target wireless access point by blocking access to the target wireless access point in response to determining that the target wireless access point is potentially illegitimate; --, therefor.

In Column 24, Line 1, delete "processor" and insert -- on the computing device --, therefor.

In Column 24, Line 2, delete "module and the determination module." and insert -- module, the determination module, and the security module. --, therefor.

In Column 24, Line 22, in Claim 20, delete "instructions" and insert -- instructions, a detection module, a determination module, and a security module. --, therefor.

In Column 24, Line 25, in Claim 20, delete "detect," and insert -- by the detection module on the computing device --, therefor.

In Column 24, Line 31, in Claim 20, delete "detect at" and insert -- detect, by the detection module on the computing device, at --, therefor.

In Column 24, Line 35, in Claim 20, delete "identifying" and insert -- identifying, by the detection module on the computing device, --, therefor.

In Column 24, Line 40, in Claim 20, delete "identifying" and insert -- identifying, by the detection module on the computing device, --, therefor.

In Column 24, Line 44, in Claim 20, delete "determine" and insert -- determine, by the detection module on the computing device, --, therefor.

In Column 24, Line 46, in Claim 20, delete "determine" and insert -- determine, by the detection module on the computing device, --, therefor.

In Column 24, Line 48, in Claim 20, delete "determine" and insert -- determine, by the detection module on the computing device, --, therefor.

In Column 24, Line 51, in Claim 20, delete "number." and insert -- and stopping, by the security module on the computing device, the attempt by the computing device to automatically connect to the target wireless access point by blocking access to the target wireless access point in response to determining that the target wireless access point is potentially illegitimate., --, therefor.